US 6,547,551 B2

(12) United States Patent
Omi et al.

(10) Patent No.: US 6,547,551 B2
(45) Date of Patent: *Apr. 15, 2003

(54) MULTILAYER CROSSHEAD

(75) Inventors: Yuzo Omi, Saitama-ken (JP); Syouji Satou, Saitama-ken (JP); Takatoshi Watanabe, Saitama-ken (JP); Akira Rikiishi, Saitama-ken (JP); Hajime Kudo, Saitama-ken (JP); Yoshitaka Ohno, Kanagawa-ken (JP); Toshio Kagitani, Kanagawa-ken (JP); Sohei Masaki, Kanagawa-ken (JP); Shoji Abe, Kanagawa-ken (JP)

(73) Assignees: The Japan Steel Works, Ltd., Tokyo (JP); Yachiyo Kogyo Kabushiki Kaisha, Saitama-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/404,997

(22) Filed: Sep. 27, 1999

(65) Prior Publication Data
US 2002/0054929 A1 May 9, 2002

(30) Foreign Application Priority Data
Sep. 30, 1998 (JP) ............................................. 10-277957

(51) Int. Cl.⁷ ................................................. B29C 47/26
(52) U.S. Cl. ................. 425/133.1; 425/145; 425/382.4; 425/532; 425/378.1
(58) Field of Search ............................... 425/133.1, 145, 425/378.1, 523, 166, 532, 382.4

(56) References Cited

U.S. PATENT DOCUMENTS

| 3,635,624 | A | * | 1/1972 | Nakakoshi et al. | 425/133.1 |
|---|---|---|---|---|---|
| 4,149,839 | A | * | 4/1979 | Iwawaki et al. | 425/133.1 |
| 4,484,883 | A | * | 11/1984 | Honda et al. | 425/133.1 |
| 4,867,664 | A | | 9/1989 | Fukuhara | 425/133.1 |
| 4,978,290 | A | * | 12/1990 | Fukuhara | 425/133.1 |
| 5,133,911 | A | * | 7/1992 | Kagitani | 425/133.1 |
| 5,252,268 | A | | 10/1993 | Ohno | 425/133.1 |
| 5,297,946 | A | * | 3/1994 | Yoshida et al. | 425/132 |
| 5,525,277 | A | | 6/1996 | Joseph | 425/135 |

FOREIGN PATENT DOCUMENTS

| EP | 306 118 | | 3/1989 | |
| GB | 2 282 887 | | 4/1995 | |
| JP | 6033928 | * | 4/1981 | 425/523 |

* cited by examiner

Primary Examiner—Robert Davis
Assistant Examiner—Thu Khanh T. Nguyen
(74) Attorney, Agent, or Firm—Sughrue Mion PLLC

(57) ABSTRACT

In a conventional multilayer crosshead, only one pressure sensor is disposed in the inlet of the annular passage, preventing monitoring of membrane discontinuities; parison thickness is not constant; as the crosshead body is not cooled and parison temperature is high, a long time is required for cooling during blow molding, preventing the reduction of the molding cycle. A multilayer crosshead according to the present invention includes pressure sensors disposed in at least two positions of the annular passage so that the flow rate is controlled and monitored so as to eliminate the pressure difference between the pressure sensors, and parison temperature is lowered to a greater degree by a cooling jacket with a built-in heater disposed in the crosshead body so that a blow molding cycle is shortened.

13 Claims, 5 Drawing Sheets

(SIX LAYERS CROSS-HEAD)

(PRESSURE SENSOR IN INFLOW INLET)

MULTILAYER CROSSHEAD

BACKGROUND OF THE INVENTION

1. Field of the Invention

The present invention relates to a multilayer crosshead for a blow molding machine and more particularly to one in which a membrane discontinuity in an annular multilayer passage is monitored using a plurality of pressure sensors, layer thickness is maintained constant by equipping an inflow inlet of the annular passage with a throttle valve, parison temperature is lowered by equipping a crosshead body with a cooling jacket with a built-in heater so that a blow molding cycle is reduced, and adhesive strength of a adhesive layer between a main material layer and a barrier layer is increased by elongating the length of a path of the layers after being merged into a multilayer.

2. Description of the Related Art

As a conventional crosshead for a blow molding machine, for example, a structure disclosed in Japanese Patent Laid-open No. 4-316808 is known, in which a main material layer, a barrier layer, an adhesive layer, etc., are extruded into each annular passage of a crosshead from each of independent extruders so that the layers are merged into a multilayer to be discharged from a die slit as a parison via a die discharge-outlet.

A conventional multilayer crosshead for a blow molding machine configured as above has the following problems. That is, since only one pressure sensor for a main material, etc., supplied to the annular passage is disposed at an accumulator of the extruder or at an inlet of the multilayer forming section, there is a problem that the pressure difference between an inflow inlet of the annular passage and a weld portion opposing the inflow inlet cannot be completely sensed. Consequently, when pressure in the weld portion is low, membrane discontinuities may occur in the weld portion, and that for example, when a parison for blow molding a container such as a gasoline tank is formed, there is no production engineering method for sensing the membrane discontinuities.

Since a valve for adjusting a flow rate is not provided in an inflow inlet of the annular passage, there is a problem that variations of thickness are produced among each layers, thus a designed parison strength has not been obtained.

Since the crosshead is not provided with a cooling means, a parison in a high temperature state is supplied to a metallic mold, there is a problem that a long time is required for cooling the molding in the metallic mold during blow molding, thus a molding cycle has not been shortened.

Further, since a distance between the merging position of the materials in the crosshead flowing down-from the annular passage and the die discharge-outlet is not especially considered in accordance with an adhesive property of the multilayer parison, when a material velocity in the die slit is increased in accordance with reduction of a molding cycle, sufficient time and pressure necessary for adhering the barrier layer and the adhesive layer are not obtained, consequently, there is a problem that adhesive strength between layers of a molded parison becomes insufficient.

SUMMARY OF THE INVENTION

Accordingly, it is an object of the present invention to solve the above-described problems and particularly to provide a multilayer crosshead in which a membrane discontinuity in a multilayer annular passage is avoided using a plurality of pressure sensors, layer thickness is maintained constant by equipping an inflow inlet of the annular passage with a throttle valve, a parison temperature is lowered by equipping a crosshead body with a cooling jacket so that a blow molding cycle is shortened, and adhesive strength among a main material layer, a barrier layer and an adhesive layer is increased by elongation of the length of a path of the die.

In accordance with the present invention, a multilayer crosshead comprises a plurality of extruders; a crosshead body; a plurality of annular passages formed in the crosshead body; a die disposed in a bottom portion of the crosshead body including a die slit having a die discharge outlet and being communicated with each of the annular passages; wherein plural materials being different from each other extruded by the plurality of extruders are supplied to the plurality of annular passages so as to flow down from the die slit to form a parison, the multilayer crosshead further comprising pressure sensors disposed in an inflow inlet of the annular passage and in a weld portion of the annular passage opposing the inflow inlet so that the pressure difference between the pressure sensors is sensed. Each of the pressure sensors may include a pressure sensing portion disposed in a concave portion adjacent to the annular passages, and a signal converter disposed outside of the crosshead body being connected to the pressure sensing portion via the length of lead wire. A multilayer crosshead may further comprise a throttle valve disposed in the inflow inlet of each of the annular passages for adjusting a flow rate of the material; and a block having the annular passages, wherein the throttle valve and the block are detachably disposed in the crosshead body. The crosshead body may be provided with a cooling jacket with a built-in heater. The cooling jackets with built-in heaters are disposed inside and outside of the crosshead body, outside of the die, and inside of the core.

At least main material layers, a barrier layer, a pulverized layer, and adhesive layers may be used as the materials, wherein a length from a position, in which these layers are merged, to the die discharge outlet of the die slit, may be established so as to unitarily adhere these layers with each other.

DESCRIPTION OF THE PREFERRED EMBODIMENTS

Figure 1:
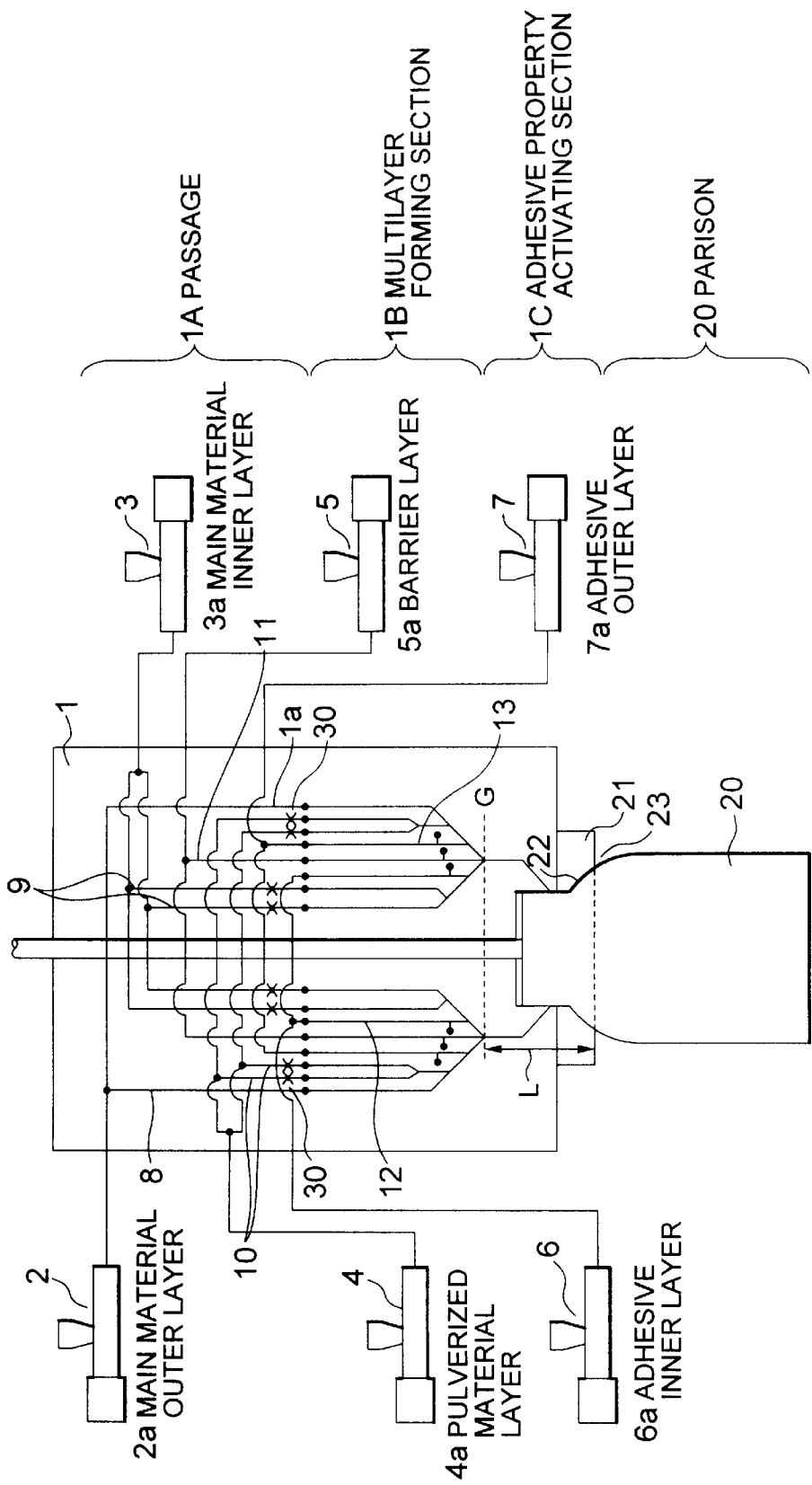
FIG. 1 is a schematic block diagram of a multilayer crosshead according to the present invention.

Referring to the drawings, a preferred embodiment of a multilayer crosshead according to the present invention will now be described.

FIG. 1 is a schematic block diagram showing an overall structure of a multilayer crosshead according to the present invention. First to sixth extruders 2 to 7 are connected to a crosshead body 1 forming the crosshead, wherein a main material outer layer 2a, a main material inner layer 3a, a pulverized material layer 4a, a barrier layer 5a, an adhesive inner layer 6a, and an adhesive outer layer 7a are supplied from the first extruder 2, the second extruder 3, the third extruder 4, the fourth extruder 5, the fifth extruder 6, and the sixth extruder 7, respectively.

In the crosshead body 1, first to sixth ring-shaped annular passages 8 to 13 are formed, wherein the main material outer layer 2a, the main material inner layer 3a, the pulverized material layer 4a, the barrier layer 5a, the adhesive inner layer 6a, and the adhesive outer layer 7a are supplied to the first annular passage 8, the second annular passage 9, the third annular passage 10, the fourth annular passage 11, the fifth annular passage 12, and the sixth annular passage 13, respectively, such that a parison 20 (not shown) integrally formed of, from the outside, the main material outer layer 2a, the pulverized material layer 4a, the adhesive outer layer 7a, the barrier layer 5a, the adhesive inner layer 6a, and the main material inner layer 3a, flows down at a constant velocity after being discharged from a die slit 22 and a die slit discharge-outlet 23 of a die 21. As shown in the right side of FIG. 1, the crosshead body 1 is vertically formed of a passage 1A, a multilayer forming section 1B, and an adhesive property activating section 1C for adhering.

Figure 4:
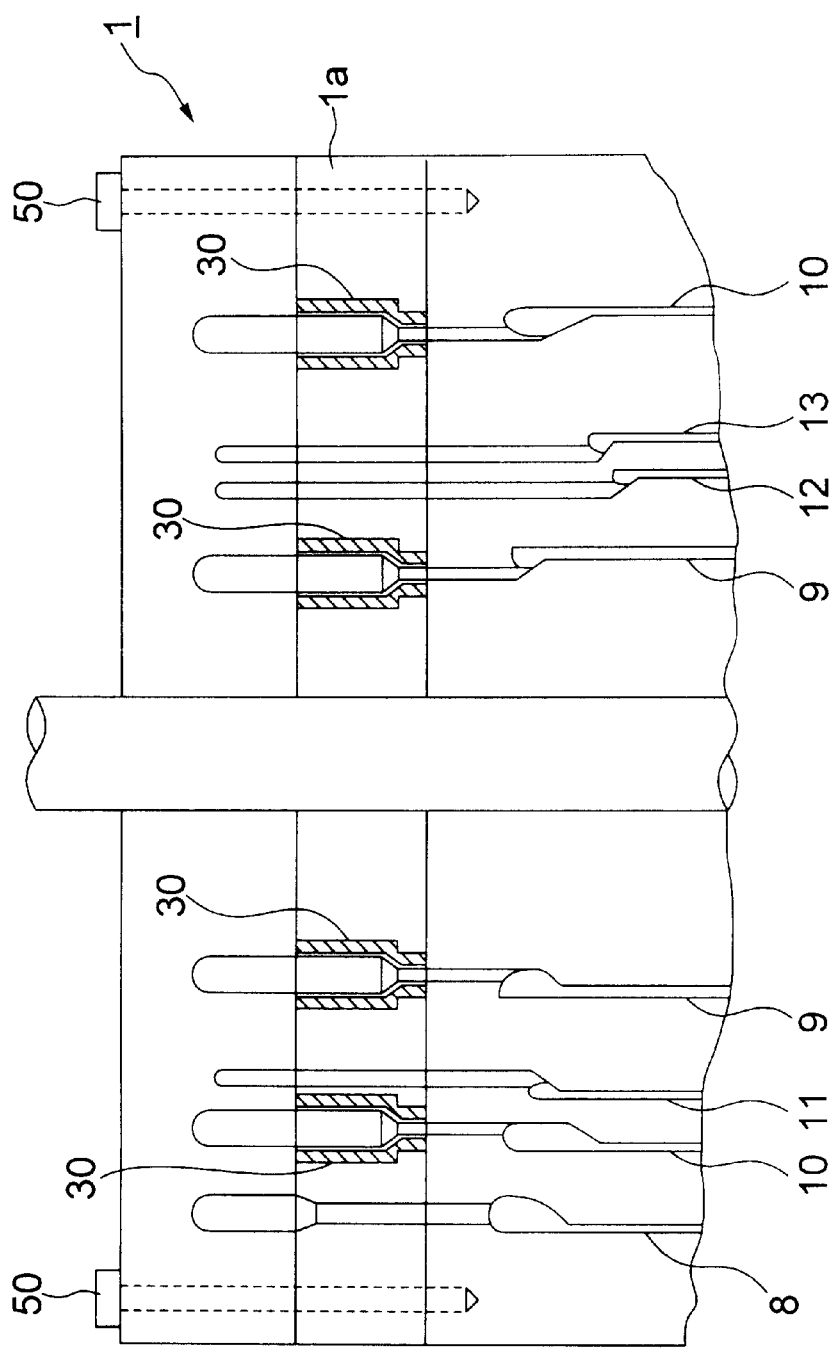
FIG. 4 is an enlarged sectional view showing the essential portion of FIG. 1.
Figure 5:
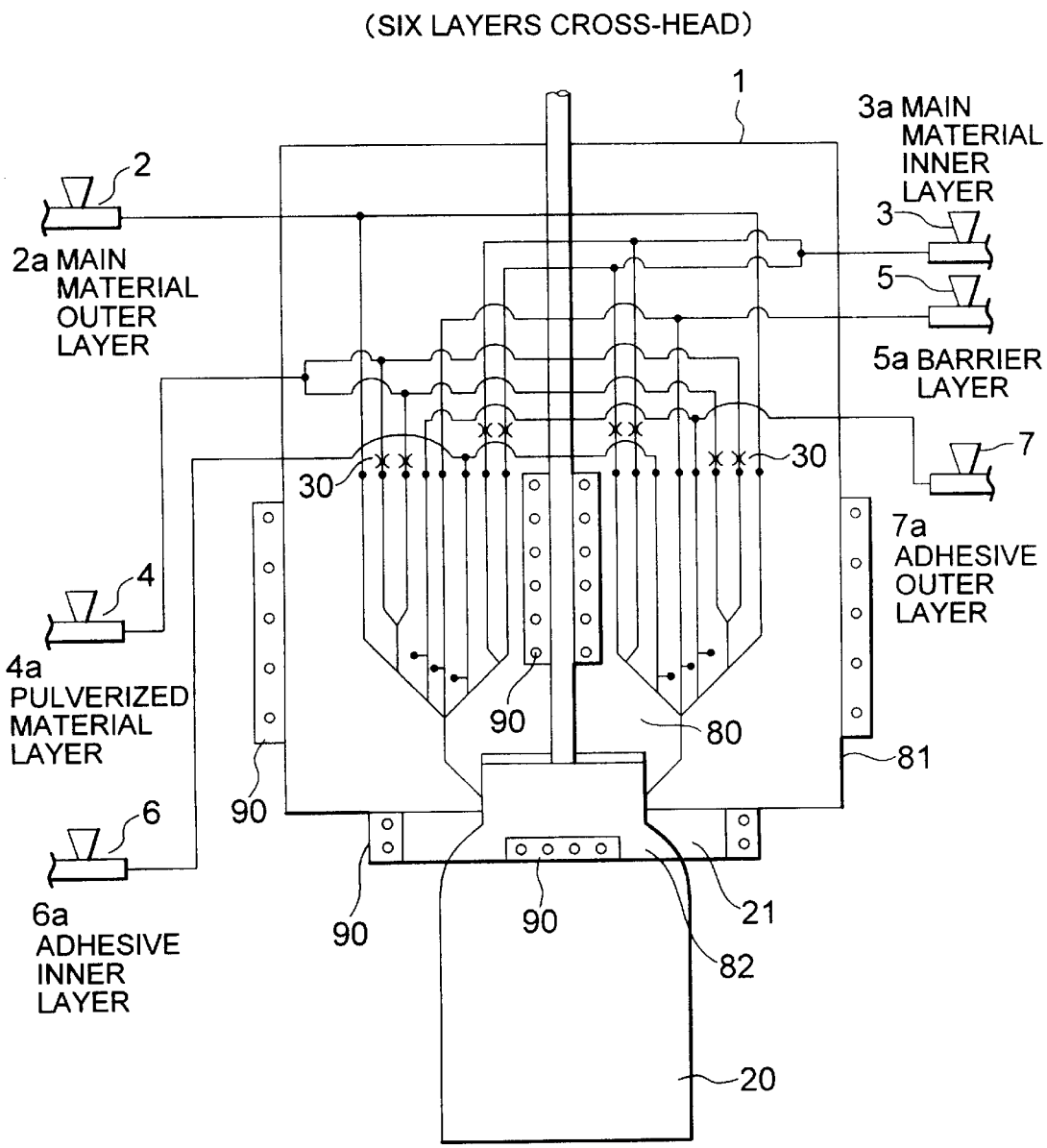
FIG. 5 is a block diagram of a multilayer crosshead according to another embodiment of the present invention.

The second and third annular passages 9 and 10 among the annular passages 8 to 13 are formed in a double ring shape. Fixed throttle valves 30 having predetermined throttling states are disposed in said annular passages 9 and 10, as shown in FIGS. 1 and 4. Balance setting is established in advance so that a thickness of each layer in the double ring is equalized at a merging position "G". These throttle valves 30 are detachably disposed using bolts 50 in a block 1a detachably formed in the upper portion of the crosshead body 1.

Figure 2:
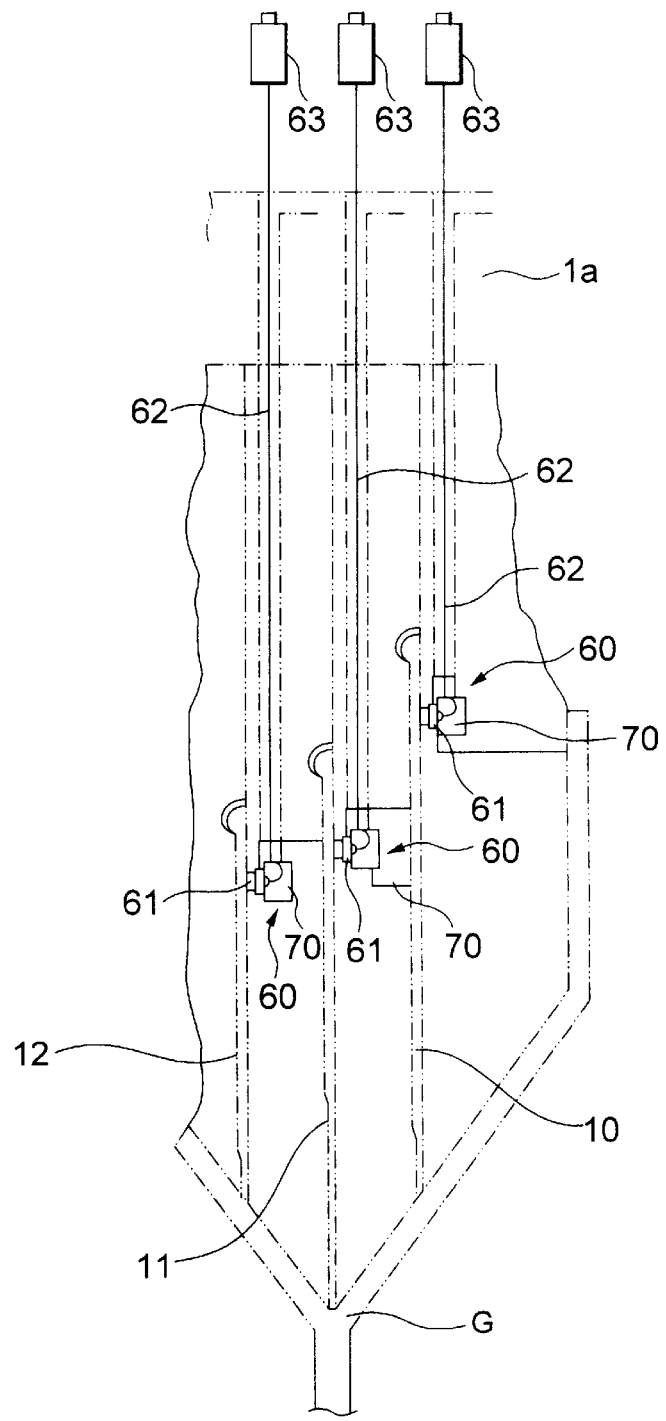
FIG. 2 is a detail sectional view illustrating pressure sensors at an inflow inlet shown in FIG. 1.
Figure 3:
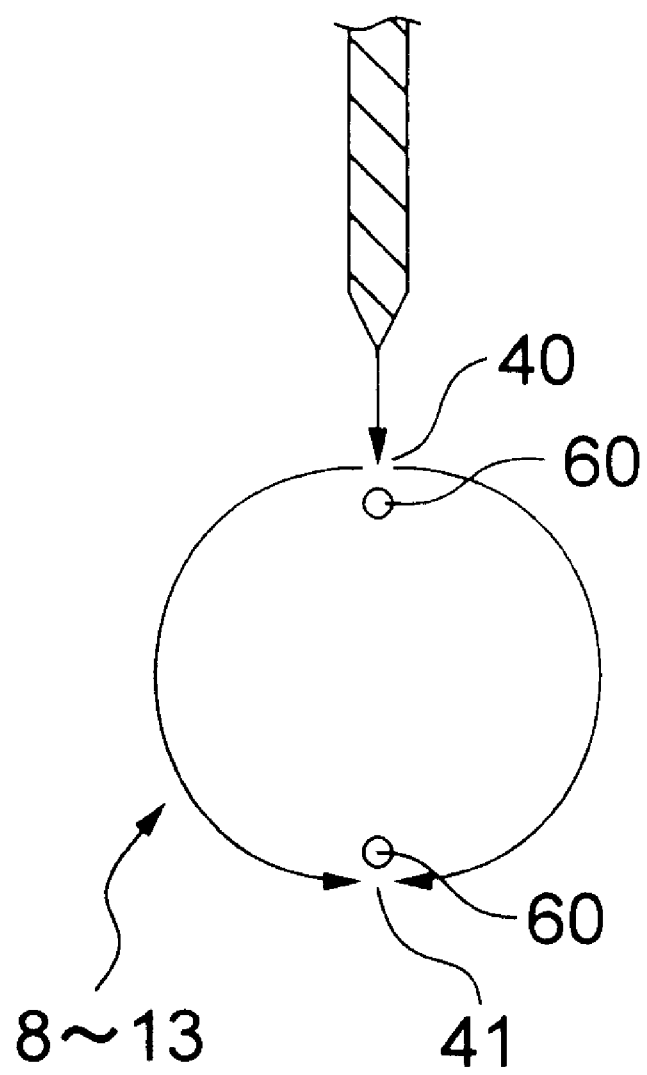
FIG. 3 is a schematic representation showing the essential portion of FIG. 1.

As shown in FIGS. 2 and 3, the annular passages 8 to 13 are formed in a complete ring shape viewed from the top so that a material is annularly supplied from the inflow inlet 40 to a weld portion 41. Since the pressure in the passage is designed so that a pressure of a resin material in the inflow inlet 40 is equalized to that in the weld portion 41 shown in FIG. 3 after the flowing resin material in an annular shape further flows along the passage, a pressure difference between the inflow inlet 40 and the weld portion 41 produces membrane discontinuities in the weld portion 41. In order to prevent variations in membrane thickness of the parison 20, pressure sensors 60 are disposed in the inflow inlet 40 and the weld portion 41. Pressure detecting portions 61 of the pressure sensors 60 are disposed in concave portions 70 in walls adjacent to the annular passages 8 to 13. Signal converters 63 connected to these pressure detecting portions 61 via lead wires 62 are disposed outside of the crosshead body 1.

Cooling jackets 90 with built-in heaters are respectively disposed inner portion 80 and outside 81 of the crosshead body 1, outside of the die 21, and inner portion of a core 82, so as to cool the discharged parison such that the time required for cooling the parison during blow molding in a metallic mold (not shown) is reduced to reduce the molding cycle.

A passage length "L" from the unitarily merging position "G" of layers 2a to 7a of materials supplied from the annular passages 8 to 13 to the die slit discharge-outlet 23 corresponds to the adhesive property activating section 1C shown in FIG. 1. In order to adhesively unite layers 2a to 7a with each other by adhesives and self-adhesiveness of each material, in the passage length "L", an internal pressure is sufficiently maintained, a resin temperature in said passages is maintained at approximately 20° C., and the residence time in the passages is maintained to be over 20 seconds, so that the sufficient adhesive property is obtained by the passage length "L".

In addition, layers 2a to 7a of the parison 20 in the above-described embodiment are described as an example, and the number of layers may be changed.

As a multilayer crosshead according to the present invention is formed as described above, the following effects can be obtained. That is, since plural pressure sensors are disposed in an inflow inlet and a weld portion of the annular passage, the forming can be performed by monitoring resin pressures in the inflow inlet and the weld portion so as to achieve stable parison formation without membrane discontinuities. In a passage formed in a double ring shape among the annular passages, layer thickness is maintained constant by equipping the inflow inlet thereof with a throttle valve, resulting in obtaining designed strength of the moldings. Since parison temperature is lowered to a greater degree by equipping the crosshead body with a cooling jacket, the cooling time for a parison during blow molding can be reduced, so that the molding cycle is shortened. As the length of a die portion disposed in the bottom of the crosshead body is set so as to obtain a sufficient distance for an adhesive property in which adhesion between layers is sufficiently secured.

What is claimed is:

1. A multilayer crosshead comprising:
   a plurality of extruders for extruding plural different materials respectively;
   a crosshead body having a plurality of annular passages formed therein; and
   a die disposed in a bottom portion of said crosshead body including a die slit having a die discharge outlet and being connected to each of said annular passages;
   wherein plural materials extruded by said plurality of extruders are supplied to said plurality of annular passages so as to flow from the die slit, said multilayer crosshead further comprising pressure sensors disposed in both an inflow inlet of said annular passage and in a weld portion opposing the inflow inlet in each of said annular passages respectively, and wherein said pressure sensors detect pressure differences between said pressure sensors disposed in each of said respective annular passages.

2. A multilayer crosshead according to claim 1, wherein each pressure sensing portions of said pressure sensors is disposed in a concave portion adjacent to said annular passages, and a signal converter disposed outside of said crosshead body being connected to said pressure sensing portion via a lead wire.

3. A multilayer crosshead according to claim 1, further comprising:
   a throttle valve disposed in the inflow inlet of each of said annular passages for adjusting a flow rate of the material; and
   a block including said annular passages,
   wherein said throttle valve and said block are detachably disposed in said crosshead body.

4. A multilayer crosshead according to claim 2, further comprising:
   a throttle valve disposed in the inflow inlet of each of said annular passages for adjusting a flow rate of the material; and
   a block including said annular passages, wherein said throttle valve and said block are detachably disposed in said crosshead body.

5. A multilayer crosshead according to claim 1, wherein said crosshead body is provided with at least one cooling jacket with a built-in heater.

6. A multilayer crosshead according to claim 2, wherein said crosshead body is provided with at least one cooling jacket with a built-in heater.

7. A multilayer crosshead according to claim 3, wherein said crosshead body is provided with at least one cooling jacket with a built-in heater.

8. A multilayer crosshead according to claim 5, wherein the cooling jackets with built-in heaters are disposed inside said crosshead body, outside said crosshead body, outside said die, and inside a core.

9. A multilayer crosshead according to claim 1, wherein at least main material layers, a barrier layer, a pulverized layer, and adhesive layers are used as the materials, and wherein a length from a position in which these layers are merged to the die discharge outlet of the die slit allows these layers to adhere to each other.

10. A multilayer crosshead according to claim 2, wherein at least main material layers, a barrier layer, a pulverized layer, and adhesive layers are used as the materials, and wherein a length from a position in which these layers are merged to the die discharge outlet of the die slit allows these layers to adhere to each other.

11. A multilayer crosshead according to claim 3, wherein at least main material layers, a barrier layer, a pulverized layer, and adhesive layers are used as the materials, and wherein a length from a position in which these layers are merged to the die discharge outlet of the die slit allows these layers to adhere to each other.

12. A multilayer crosshead according to claim 5, wherein at least main material layers, a barrier layer, a pulverized layer, and adhesive layers are used as the materials, and wherein a length from a position in which these layers are merged to the die discharge outlet of the die slit allows these layers to adhere to each other.

13. A multilayer crosshead according to claim 6, wherein at least main material layers, a barrier layer, a pulverized layer, and adhesive layers are used as the materials, and wherein a length from a position in which these layers are merged to the die discharge outlet of the die slit allows these layers to adhere to each other.

* * * * *